(12) United States Patent
Liu et al.

(10) Patent No.: US 8,774,178 B2
(45) Date of Patent: Jul. 8, 2014

(54) CALL TRANSFER WITH MULTIPLE APPLICATION SERVERS IN SESSION INITIATION PROTOCOL-BASED NETWORK

(75) Inventors: Isaac Jian Liu, Qingdao (CN); Ivy Qingfang Meng, Qingdao (CN); Alexander Aihao Yin, Qingdao (CN); Chun Yu Yu, Qingdao (CN)

(73) Assignee: Alcatel Lucent, Paris (FR)

( * ) Notice: Subject to any disclaimer, the term of this patent is extended or adjusted under 35 U.S.C. 154(b) by 2046 days.

(21) Appl. No.: 11/830,326

(22) Filed: Jul. 30, 2007

(65) Prior Publication Data

US 2009/0034516 A1      Feb. 5, 2009

(51) Int. Cl.
*H04L 12/28* (2006.01)
*H04J 1/16* (2006.01)

(52) U.S. Cl.
USPC ............ 370/389; 370/252; 370/352; 370/401

(58) Field of Classification Search
USPC .................................. 370/252, 389, 352, 401
See application file for complete search history.

(56) References Cited

U.S. PATENT DOCUMENTS

| | | | |
|---|---|---|---|
| 7,027,577 B2 * | 4/2006 | Gourraud et al. | 379/202.01 |
| 7,738,445 B2 * | 6/2010 | Ibezim et al. | 370/352 |
| 7,746,848 B2 * | 6/2010 | Hakusui | 370/352 |
| 7,898,990 B2 * | 3/2011 | Kallio et al. | 370/261 |
| 2003/0026245 A1 * | 2/2003 | Ejzak | 370/352 |
| 2003/0059019 A1 * | 3/2003 | Chakera | 379/211.02 |
| 2004/0176084 A1 * | 9/2004 | Verma et al. | 455/417 |
| 2005/0227685 A1 * | 10/2005 | Costa Requena et al. | 455/423 |

(Continued)

FOREIGN PATENT DOCUMENTS

| | | |
|---|---|---|
| EP | 1720333 | 11/2006 |
| GB | 2432748 | 5/2007 |
| WO | PCTUS2008008935 | 11/2008 |

OTHER PUBLICATIONS

J. Rosenberg et al., "SIP: Session Initiation Protcol," Network Working Group Request for Comments, RFC 3261, Standards Track, Jun. 2002, pp. 1-269.
R. Sparks, "The Session Initiation Protcol (SIP) Refer Method," Network Working Group Request for Comments, RFC 3515, Standards Track, Apr. 2003, pp. 1-23.

(Continued)

*Primary Examiner* — John Pezzlo
(74) *Attorney, Agent, or Firm* — Ryan, Mason & Lewis, LLP

(57) ABSTRACT

Call transfer techniques between multiple application servers in a SIP-based network or other type of communication network are disclosed. In accordance with one example technique of the invention, it is assumed that a first call is established between a first user device and a second user device via a first server, and the second user device, wishing to initiate a call transfer to a third user device, establishes a second call between itself and the third user device via a second server. Thus, the technique includes the following steps. Upon the first server receiving a call transfer request from the second user device such that the first user device and the third user device can communicate, it is determined whether the first server has information that matches the second call. Upon determining that the first server does not have information matching the second call, a message is sent from the first server to the second server so as to obtain information from the third device such that the first user device and the third user device can communicate via the first server. The message sent from the first server to the second server indicates that the call transfer request was referred by the second user device.

15 Claims, 6 Drawing Sheets

(56) References Cited

U.S. PATENT DOCUMENTS

| | | | |
|---|---|---|---|
| 2006/0092970 A1* | 5/2006 | Song et al. | 370/466 |
| 2006/0239253 A1* | 10/2006 | Gallant et al. | 370/352 |
| 2008/0002820 A1* | 1/2008 | Shtiegman et al. | 379/211.02 |
| 2008/0160991 A1* | 7/2008 | Constantinof et al. | 455/426.2 |
| 2009/0003380 A1* | 1/2009 | Jackson | 370/466 |
| 2009/0024601 A1* | 1/2009 | Zmolek | 707/4 |
| 2010/0312870 A1* | 12/2010 | Kennedy et al. | 709/223 |

OTHER PUBLICATIONS

R. Mahy et al., "The Session Initiation Protcol (SIP) "Replaces" Header," Network Working Group Request for Comments, RFC 3891, Standards Track, Sep. 2004, pp. 1-16.

R. Ackermann, "Gateways and Components for Supplementary IP Telephony Services in Heterogeneous Environments," XP-002392870, pp. 103-112, May 13, 2003.

* cited by examiner

*FIG. 4*

```
REFER sip:135.252.30.31:5060 SIP/2.0
Via: SIP/2.0/UDP 10.86.2.52:5060;branch=z9hG4bKcef37b41af-94675289680000
Via: SIP/2.0/UDP 127.0.0.1;branch=z9hG4bk_03584-270184072;
Via: SIP/2.0/UDP 10.86.0.185:5060;received=10.86.0.185;branch=z92E33A76
To: "0012 edas" <sip:0012@ims.lucentlab.com;user=phone>;tag=18591-114120
From: "0013 edas" <sip:013@ims.lucentlab.com;user=phone>;tag=1AA9C6
Call-ID: BW1815298070103061404793738@135.252.30.31
CSeq: 2 REFER
Contact: <sip:+16308610013@10.86.0.185:5060>
Max-Forwards: 68
Refer-To:
<sip:+16308610011@ims.lucentlab.com;user=phone?Replaces=6e67fbdd-
64fd0bc3-cf15e39e%4010.86.0.185%3Bto-tag%3D81628460-11412
08146548%3Bfrom-tag%3D4FF52BB9-C99BDF5C>
Referred-By: "0013 edas" <sip:+16308610013@ims.lucentlab.com;user=phone>
User-Agent: PolycomSoundPointIP-SPIP_600-UA/1.4.1
Content-Length: 0
```

*FIG. 5*

```
INVITE sip:135.252.30.31:5060 SIP/2.0
Via: SIP/2.0/UDP 135.252.30.31:branch=z9hG4bK-1351438394-11412081145961
From; "0013 edas"<sip:0013@ims.lucentlab.com;user=phone>;tag=135-1141208
To: "0011 edas"<sip:0011@ims.lucentlab.com;user=phone;dgc>;tag=16949750
Call-ID:BW181545961010306-51456451 6@135.252.30.31
CSeq:447164438 INVITE
Route:<sip:scsf-stdn.qdssp21.lucentlab.com:5060;1r;sdp=ck;1sstag=so-241-141>,
<sip:scsf-stdn.s1c04.qdssp21.lucentlab.com:5060;1r;sdp=ck;1sstag=st-242-142>
Contact:<sip:135.252.30.31:5060>
Allow:ACK, BYE, CANCEL, INFO, INVITE, OPTIONS, PRACK, REFER, UPDATE, NOTIFY
Supported:
Accept:multipart/mixed,application/sdp
Replaces=6e67fbdd-64fd0bc3-cf15e39e%4010.86.0.185%3Bto-tag%3D81628460-
11412081465 48%3Bfrom-tag%3D4FF52BB9-C99BDF5C>
Referred-By: "0013 edas" <sip:+16308610013@ims.lucentlab.com
Max-Forwards:10
Content-Length:0
```

CALL TRANSFER WITH MULTIPLE APPLICATION SERVERS IN SESSION INITIATION PROTOCOL-BASED NETWORK

FIELD OF THE INVENTION

The present invention relates generally to communication networks, and more particularly to call transfer techniques for use in Session Initiation Protocol (SIP)-based networks, such as IP Multimedia Subsystem (IMS) networks, and other types of communication networks.

BACKGROUND OF THE INVENTION

Session Initiation Protocol (SIP) is rapidly becoming the de facto signaling protocol for establishing, modifying and terminating multimedia sessions between users in a communication network. SIP is described in J. Rosenberg et al., "SIP: Session Initiation Protocol," Internet Engineering Task Force (IETF) RFC 3261, June 2002, which is incorporated by reference herein. SIP has also been adopted for the IP Multimedia Subsystem (IMS), which is the next-generation core network architecture for mobile and fixed services defined by the 3rd Generation Partnership Project (3GPP).

Further, SIP is commonly utilized in conjunction with Voice over Internet Protocol (VoIP) communications wherein users may participate in voice-based communication sessions (i.e., "calls") over an IP network. Thus, in this context, SIP is used in call setup, call disconnect and call feature implementation. Other types of multimedia may be transferred over the network in accordance with a SIP-based call.

With more and more deployments of SIP-based networks, carriers have put much more of a focus on providing multimedia services and value-added applications in order to generate new revenue. However, with the addition of multiple applications, the likelihood increases that two or more applications must interact with one another. Unfortunately, the SIP protocol does not adequately support such interworking between multiple application servers running such applications, particularly in accordance with functions such as call transfer.

It is therefore apparent that a need exists for call transfer techniques between multiple application servers, particularly in SIP-based networks.

SUMMARY OF THE INVENTION

The present invention in an illustrative embodiment provides call transfer techniques between multiple application servers in a SIP-based network or other type of communication network.

In accordance with one aspect of the invention, a technique for providing a call transfer service in a communication network is provided. It is assumed that a first call is established between a first user device and a second user device via a first server, and the second user device, wishing to initiate a call transfer to a third user device, establishes a second call between itself and the third user device via a second server. Thus, the technique comprises the following steps. Upon the first server receiving a call transfer request from the second user device such that the first user device and the third user device can communicate, it is determined whether the first server has information that matches the second call. Upon determining that the first server does not have information matching the second call, a message is sent from the first server to the second server so as to obtain information from the third device such that the first user device and the third user device can communicate via the first server. The message sent from the first server to the second server indicates that the call transfer request was referred by the second user device.

In one embodiment, the communication network comprises a Session Initiation Protocol (SIP) based network. The first user device, the second user device and the third user device may comprise SIP phones. The first server and the second server may comprise SIP application servers. Communication between the first user device, the second user device, the third user device, the first server and the second server may go through a call session control function (CSCF) server. The call transfer request received by the first server from the second user device may comprise a REFER message with a Replace header field identifying the second call. The message sent from the first server to the second server may comprise a Replace header field identifying the second call and a Referred-By header field indicating that the call transfer request was referred by the second user device. The Replace header field and the Referred-By header field may be part of an INVITE message.

These and other features and advantages of the present invention will become more apparent from the accompanying drawings and the following detailed description.

BRIEF DESCRIPTION OF THE DRAWINGS

FIG. 4 shows an example of a REFER message for invoking call transfer according to an embodiment of the invention.

FIG. 5 shows an example of an INVITE message with Replace Header and Referred-By according to an embodiment of the invention.

DETAILED DESCRIPTION OF PREFERRED EMBODIMENTS

The present invention will be illustrated below in conjunction with exemplary SIP-based networks and call transfer techniques. It should be understood, however, that the invention is not limited to use with the particular call transfer techniques of the illustrative embodiments, nor with any particular type of network or other communication network. The disclosed techniques are suitable for use with a wide variety of other systems and in numerous alternative applications.

The following is a list of acronyms that are used in describing illustrative embodiments of the invention:

AS Application Server
CSCF Call Session Control Function
IMS IP Multimedia Subsystem
I-CSCF Interrogating CSCF
iFC Initial Filter Criteria
P-CSCF Proxy CSCF
S-CSCF Serving CSCF
SIP Session Initiated Protocol
SDP Session Description Protocol
UE User Equipment
VoIP Voice over IP A network element that processes and forwards SIP messages is called a proxy server in SIP terminology, and a Call Session Control Function (CSCF) in IMS terminology. 3GPP defines three types of CSCF elements: Proxy CSCF (P-CSCF) which is the interface to the user, Interrogating CSCF (I-CSCF) which provides an interface to other servers in different administration domains, and Serving CSCF (S-CSCF) which handles registration, enforces policy and provides an interface to application servers. A network element that hosts one or more applications or services is referred to as an Application Server (AS). A network element employed by a user to access the communication network is referred to as User Equipment (UE). A signaling network comprising these and other network elements is referred to herein as a SIP-based network.

More particularly, a SIP Application Server in an IMS network hosts and executes service logic based on the subscriber's (user's) service profile or/and on the terminal capability (user's device profile) and provides supplementary services such as call waiting and call transfer to IMS UE.

Furthermore, the CSCF manages SIP sessions and coordinates with other network elements for session control, feature/service control and resource allocation. A session manager includes the following roles: S-CSCF—session control point for UE as an originator and terminator, I-CSCF—the contact point into the UE's home network for other networks, P-CSCF—the contact point into the IMS for the UE.

Still further, a SIP Phone is a UE that implements the SIP User Agent functionality that the user can use to initiate and terminate SIP calls. SIP phones can be actual phones that are configured to provide VoIP capabilities. Also, there are SIP soft phones that are implemented totally in software and run on a user's personal computer. Almost all SIP phones today support some form of call transfer service.

Figure 1:
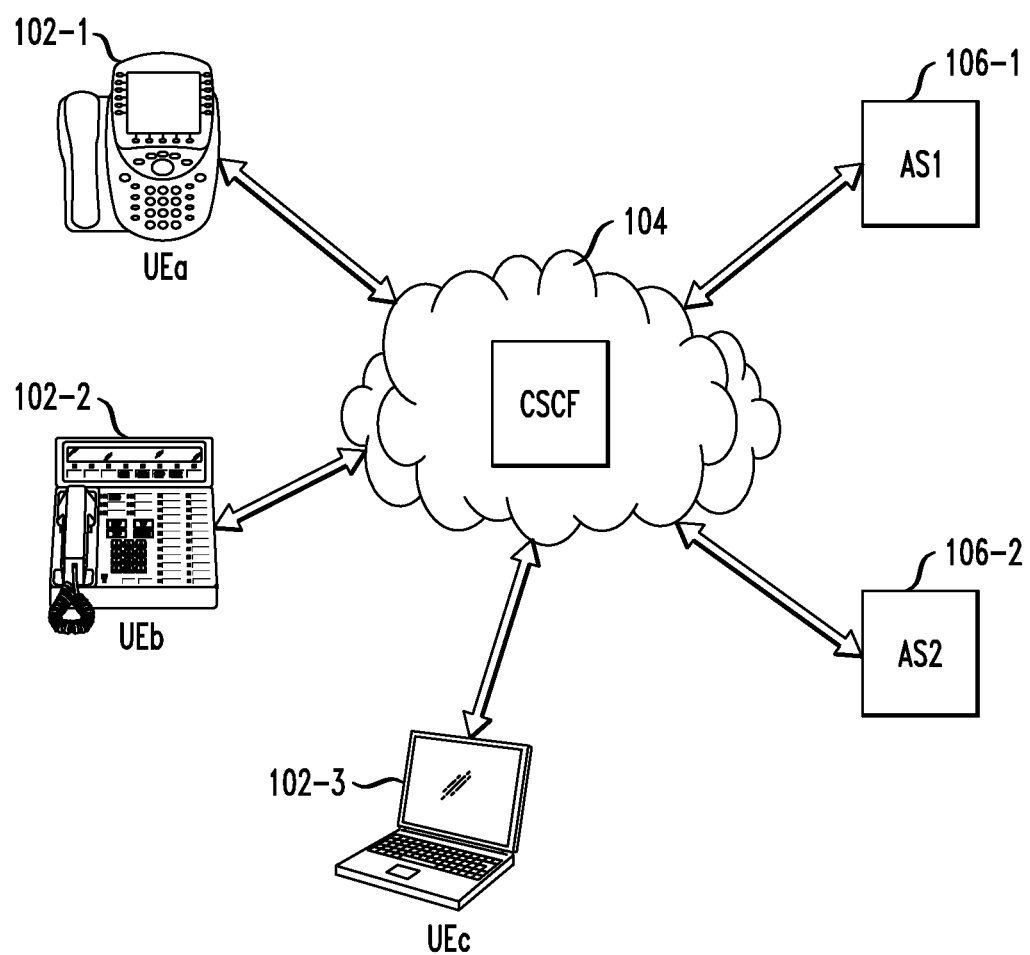
FIG. 1 shows a portion of a SIP-based network in which an embodiment of the invention may be implemented.

FIG. 1 shows a portion of a SIP-based network 100 in which an embodiment of the invention may be implemented. As shown, the portion of network 100 includes SIP 102-1 (UEa), SIP phone 102-2 (UEb), SIP phone 102-3 (UEc), CSCF server 104, application server 106-1 (AS1) and application server 106-2 (AS2). Each network element may communicate with another network element via one or more communication paths. The portion of the network 100 shown in FIG. 1 is considerably simplified for clarity of illustration, and a typical such network will include a multiplicity of servers serving many user devices. Also, the term "path" as used herein is intended to be construed broadly, to encompass any communication arrangement involving multiple elements of a network, and should not be viewed as requiring any particular type of link setup or communication protocol. Thus, a given path may, but need not, be set up in accordance with a communication protocol.

In accordance with R. Sparks, "The Session Initiation Protocol (SIP) Refer Method," Internet Engineering Task Force (IETF) RFC 3515, April 2003, which is incorporated by reference herein, the REFER message is usually used to trigger a Call Transfer service. A REFER message is issued by the transferor to ask the transferee to initiate an INVITE to the transfer-target.

Figure 2:
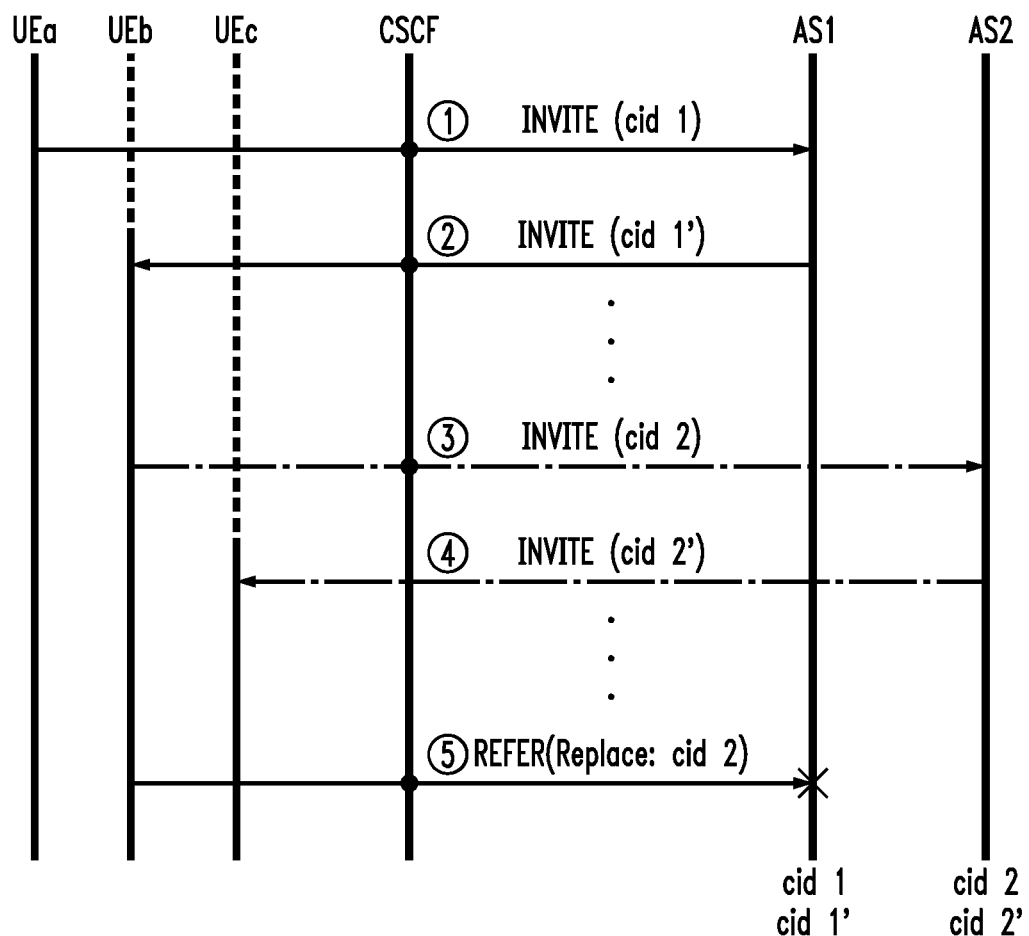
FIG. 2 shows call flow between network elements of a SIP-based network.

A typical procedure of Call Transfer with Consultation is shown in FIG. 2, in the context of the network elements depicted in FIG. 1. The steps below correspond to the encircled numbers in the call flow diagram of FIG. 2. It is to be understood that the phrase "with consultation" refers to the fact that the subject call is answered before the call transfer service is applied.

1. Initially an INVITE message is sent by UEa to CSCF to create a new communication session, and the INVITE message is routed to application server (AS1) by CSCF.

2. AS1 creates a new INVITE and sends it to CSCF, and on receiving this message, CSCF routes this message to UEb. After some messages are transferred back and forth, the call between UEa and UEb is established (identified as cid 1 and cid 1', where "cid" means call-id).

3. With this active call, UEb (transferor) starts to invoke the Call Transfer with Consultation service. UEb holds UEa (transferee) and sends a new INVITE message to communicate with UEc (transfer-target) via AS2.

4. AS2 sends the INVITE message received from UEb to UEc in order to set up a call between UEb and UEc (cid 2). UEc answers the call initiation request from UEb.

5. UEb sends AS1 a REFER message containing Replace header with the value of cid2. This is where a problem arises.

In accordance with R. Mahy et al., "The Session Initiation Protocol (SIP) Replaces Header," Internet Engineering Task Force (IETF) RFC 3891, September 2004, which is incorporated by reference herein, the Replaces header contains information used to match an existing SIP dialog (call-id, to-tag, and from-tag). When AS1 receives this REFER message with Replace header, AS1 will attempt to match this information with an earlier call (i.e., by matching call-id or cid numbers). If AS 1 finds a call matching the Replace field, then it will send a reINVITE message to connect UEa and UEc, and tear down the two "half-calls" associated with UEb, according the Replace and Refer-to header. It is to be understood that when the call between UEa and UEb is established (step 1 and 2), the call between UEa and AS1 may be considered a "half-call" and the call between UEb and AS1 is another "half-call" due to the fact that AS1 is functioning as a B2BUA (Back-to-Back User Agent) AS. When UEb applies the call transfer service and tries to invoke UEc, there are two half-calls between UEb and UEc—one half-call is between UEb and AS2, and another half-call is between UEc and AS2. Thus, from the perspective of UEb, there are two half-calls—one is between UEb and AS1 and another is between UE and AS2.

However, as used herein, the term "half-call" is understood to be a specific type of "call," and thus is considered as being within the definition of the more general term "call." Therefore, it can be stated that, if AS1 finds a call matching the Replace field, then it will send a reINVITE message to connect UEa and UEc, and tear down the two calls on the UEb side, according to the Replace and Refer-to header.

In the scenario in FIG. 2, the call between UEb and UEc does not go through AS1. Therefore, when AS1 receives the REFER message with Replace header including cid2 information, it can not find the call information (i.e., it can not match it with an earlier call that it handled). The REFER message is therefore declined with a 603 response by AS1. Thus, the requested call transfer does not occur.

In an IMS network, multimedia services are one of the most important advantages compared with 2G (2nd Generation) networks. With an increase in distributed services, there is an increase in the number of application servers to be configured to support them. Thus, the problem described above in the context of FIG. 2 will disadvantageously limit the distribution of IMS services and block service extension.

In accordance with principles of the invention, we provide techniques for overcoming the non-matched Replace header problem. In an illustrative embodiment, we add a new transaction between AS 1 and AS2 via CSCF to convey the non-matched Replace header. In order to instruct the new transaction to arrive at the correct destination, a Referred-By header is appended to the INVITE message. In the illustrative embodiment, CSCF is also configured to handle this header for routing the request of this new transaction.

Figure 3:
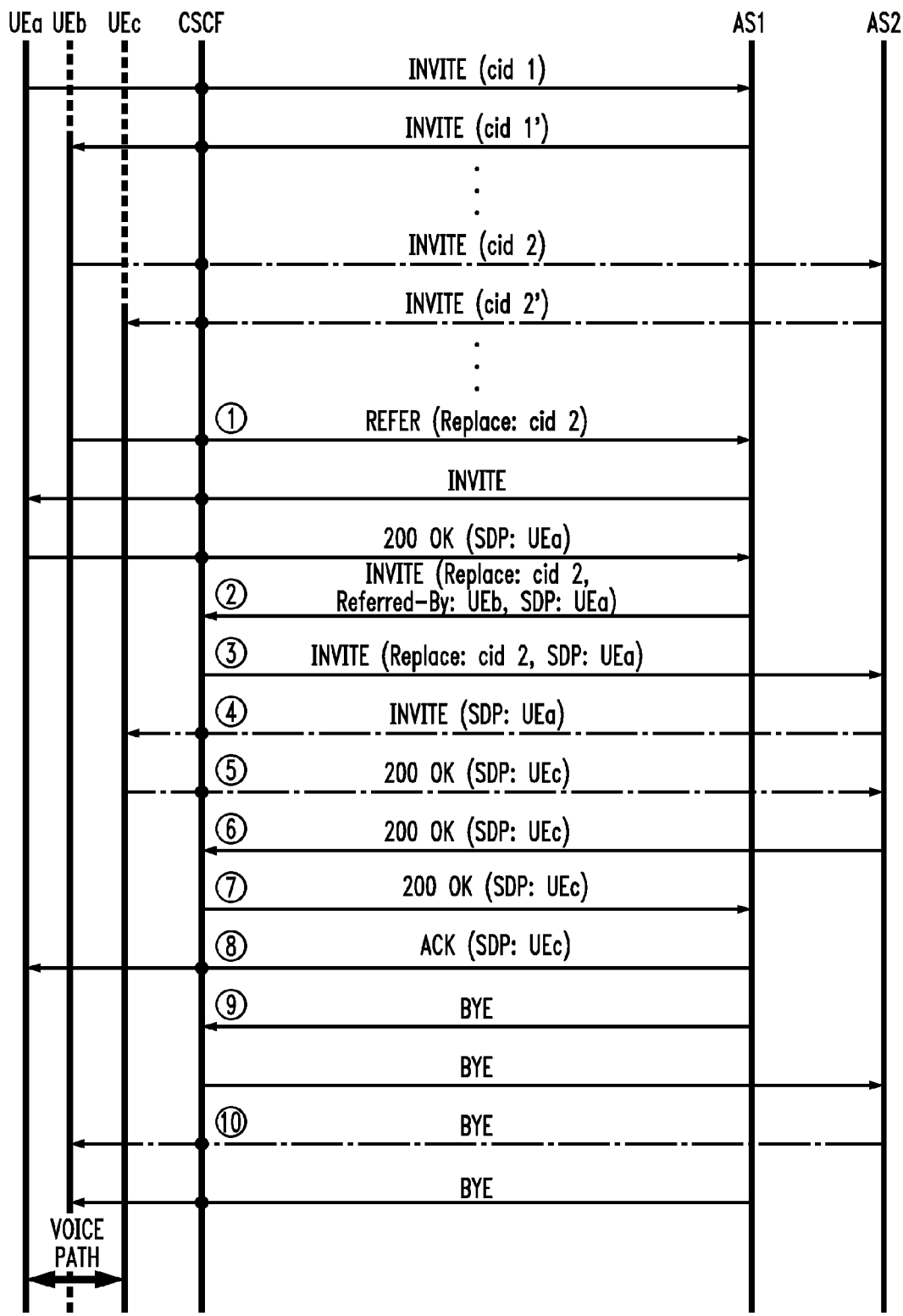
FIG. 3 shows call flow between network elements of a SIP-based network according to an embodiment of the invention.

FIG. 3 illustrates an improved Call Transfer with Consultation procedure for overcoming the existing problem according to an illustrative embodiment. Again, the improved procedure is described in the context of the network elements depicted in FIG. 1. The steps below correspond to the encircled numbers in the call flow diagram of FIG. 3.

1. It is assumed that the procedure picks up from the point in FIG. 2 where AS 1 receives the non-matched REFER message. FIG. 4 illustrates an example of a REFER message. Note also that the purpose of the INVITE message and the 200 OK message transferred between AS1 and UEa after the REFER message is received by AS1 is for the media negotiation between UEa and UEc.

2. Since the specified call is not found, in accordance with an illustrative embodiment of the invention, AS1 sends a new INVITE message to CSCF including Replace header (cid2), Referred-By (UEb) header and UEa's new SDP information. As is known, SDP describes the media content of the session. FIG. 5 illustrates an example of the new INVITE message (with Replace Header and Referred-By Header).

3. When CSCF receives this INVITE with the Replace header, it will check whether there is Referred-By header present. Since there is, CSCF will handle this INVITE message the same as an INVITE from a Referred-By entity. For our case, UEb is the Referred-By entity. Thus, CSCF routes the INVITE message to AS2.

4. AS2 finds an earlier call matching the Replace field and then sends UEc a reINVITE (via CSCF) to obtain UEc's media (SDP) info via CSCF.

5. UEc sends a 200 OK message for reINVITE (via CSCF) to AS2.

6. After getting 200 OK message for reINVITE (via CSCF) from UEc, AS2 sends a 200 OK message with UEc's new media information to AS1 via CSCF.

7. CSCF sends the 200 OK message received from AS2 to AS1.

8. AS1 sends UEa an ACK message with UEc's new media information (via CSCF).

9. AS1 sends AS2 a BYE message via CSCF to terminate the new transaction.

10. Then AS1 and AS2 send a BYE message to tear down UEb.

At this point, the Call Transfer with Consultation service is successfully completed.

Advantageously, as illustrated above, principles of the invention provide an improvement to various aspects of call transfer services in a SIP-based network. For example, the SIP interface is improved by appending a Referred-By header to the INVITE message. The main purpose of this header is to instruct the CSCF to convey service related information to the next "hop." The term "hop" refers to a SIP node. For example, the next hop is AS2 herein when CSCF receives an INVITE with Referred-By header: UEb.

With respect to application servers, principles of the invention provide the following exemplary advantages:
  (1) For the role of AS1:
  Provides for mechanism to not reject the REFER message if the Replace header information is not matched with the call information.
  Adds a Referred-By header into the INVITE message.
  Upon receiving new media from UEa, AS1 initiates a new transaction. In this procedure, Replace header and UEc's new media information will be forwarded and UEa will send acknowledgement when it gets UEc's new media information.

(2) For the role of AS2:
  Enhanced to handle the INVITE with Replace header. If matched earlier call is found, AS2 will re-invite UEc and send 200 OK back with UEc new media information. When AS2 gets a confirmation for this 200 OK, it will tear down the call matching the Replace field.

With respect to the CSCF, principles of the invention provide the following exemplary advantages:
  Enhanced to support the Referred-By header. The CSCF will parse the Referred-By header and rout the request with this Replace header according to the Referred-By header.

Figure 6:
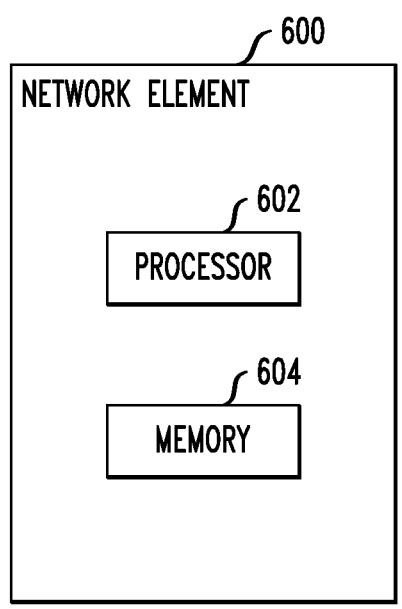
FIG. 6 shows a computing architecture of a network element for use in implementing call transfer techniques of the invention

Lastly, FIG. 6 illustrates a computing architecture 600 of a network element for use in implementing the call transfer techniques of the invention. That is, FIG. 6 may be considered a computing architecture used to implement the SIP phones (UE), the application servers (AS), the call session control function (CSCF) servers, or other network elements. Of course, it is to be understood that the invention is not limited to any particular computing system implementation.

In this illustrative implementation, a processor 602 for implementing at least a portion of the methodologies of the invention is operatively coupled to a memory 604.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc. Memory 604 may be considered a computer or processor readable storage medium.

Accordingly, one or more computer programs, or software components thereof, including instructions or code for performing the methodologies of the invention, as described herein, may be stored in memory 604 and, when ready to be utilized, loaded in whole or in part and executed by the processor 602.

In any case, it is to be appreciated that the techniques of the invention, described herein and shown in the appended figures, may be implemented in various forms of hardware, software, or combinations thereof e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
  in a communication network wherein a first call is established between a first user device and a second user device via a first server, and the second user device, wishing to initiate a call transfer to a third user device, establishes a second call between itself and the third user device via a second server and upon the first server receiving a call transfer request from the second user device such that the first user device and the third user device can communicate, determining whether the first server has information that matches the second call; and upon determining that the first server does not have information matching the second call, sending a message from the first server, which is routed to the second server, so as to obtain information from the third user device such that the first user device and the third user device can communicate via the first server, wherein the message sent from the first server and routed to the second server indicates that the call transfer request was referred by the second user device;

wherein sending the message from the first server comprises sending an invite message to a call session control function (CSCF) server so as to enable the CSCF server to route the invite message to the second server, the invite message comprising a Replace header field identifying the second call, a Referred-By header field indicating that the call transfer request was referred by the second user device, and media information of the first user device.

2. The method of claim 1, wherein the communication network comprises a Session Initiation Protocol (SIP) based network.

3. The method of claim 2, wherein the first user device, the second user device and the third user device comprise SIP phones.

4. The method of claim 2, wherein the first server and the second server comprise SIP application servers.

5. The method of claim 2, wherein communication between the first user device, the second user device, the third user device, the first server and the second server goes through the CSCF server.

6. The method of claim 2, wherein the call transfer request received by the first server from the second user device comprises a REFER message with a Replace header field identifying the second call.

7. An apparatus in a first server comprising:
a memory; and
a processor coupled to the memory and configured to: (i) in a communication network wherein a first call is established between a first user device and a second user device via the first server, and the second user device, wishing to initiate a call transfer to a third user device, establishes a second call between itself and the third user device via a second server and upon the first server receiving a call transfer request from the second user device such that the first user device and the third user device can communicate, determining whether the first server has information that matches the second call; and (ii) upon determining that the first server does not have information matching the second call, sending a message from the first server, which is routed to the second server, so as to obtain information from the third user device such that the first user device and the third user device can communicate via the first server, wherein the message sent from the first server and routed to the second server indicates that the call transfer request was referred by the second user device;

wherein sending the message from the first server comprises sending an invite message to a call session control function (CSCF) server so as to enable the CSCF server to route the invite message to the second server, the invite message comprising a Replace header field identifying the second call, a Referred-By header field indicating that the call transfer request was referred by the second user device, and media information of the first user device.

8. The apparatus of claim 7, wherein the communication network comprises a Session Initiation Protocol (SIP) based network.

9. The apparatus of claim 8, wherein the first user device, the second user device and the third user device comprise SIP phones.

10. The apparatus of claim 8, wherein the first server and the second server comprise SIP application servers.

11. The apparatus of claim 8, wherein communication between the first user device, the second user device, the third user device, the first server and the second server goes through the CSCF server.

12. The apparatus of claim 8, wherein the call transfer request received by the first server from the second user device comprises a REFER message with a Replace header field identifying the second call.

13. A system for use in routing messages in a network, comprising:
a first server of the network for providing a call transfer service, wherein a first call is established between a first user device and a second user device via the first server, and the second user device, wishing to initiate a call transfer to a third user device, establishes a second call between itself and the third user device via a second server;
wherein the first server is configured to (i) upon the first server receiving a call transfer request from the second user device such that the first user device and the third user device can communicate, determining whether the first server has information that matches the second call; and (ii) upon determining that the first server does not have information matching the second call, sending a message from the first server, which is routed to the second servers so as to obtain information from the third user device such that the first user device and the third user device can communicate via the first server, wherein the message sent from the first server and routed to the second server indicates that the call transfer request was referred by the second user device;

wherein the first server is configured to send the message by sending an invite message to a call session control function (CSCF) server so as to enable the CSCF server to route the invite message to the second server, the invite message comprising a Replace header field identifying the second call, a Referred-By header field indicating that the call transfer request was referred by the second user device, and media information of the first user device.

14. The system of claim 13, wherein the communication network comprises a Session Initiation Protocol (SIP) based network.

15. The system of claim 14, wherein the call transfer request received by the first server from the second user device comprises a REFER message with a Replace header field identifying the second call.

* * * * *